(12) United States Patent
Vogt et al.

(10) Patent No.: US 12,325,076 B2
(45) Date of Patent: Jun. 10, 2025

(54) OPERATING KEY FOR STATIONARY AND DRIVEN TOOL HOLDERS

(71) Applicant: WTO Vermögensverwaltung GmbH, Ohlsbach (DE)

(72) Inventors: Matthias Vogt, Oberkirch (DE); Karlheinz Jansen, Schutterwald (DE)

(73) Assignee: WTO Vermögensverwaltung GmbH, Ohlsbach (DE)

( * ) Notice: Subject to any disclaimer, the term of this patent is extended or adjusted under 35 U.S.C. 154(b) by 0 days.

(21) Appl. No.: 17/616,889

(22) PCT Filed: May 27, 2020

(86) PCT No.: PCT/EP2020/064711
§ 371 (c)(1),
(2) Date: Dec. 6, 2021

(87) PCT Pub. No.: WO2020/245000
PCT Pub. Date: Dec. 10, 2020

(65) Prior Publication Data
US 2022/0324034 A1    Oct. 13, 2022

(30) Foreign Application Priority Data

Jun. 6, 2019  (DE) ..................... 10 2019 115 386.7

(51) Int. Cl.
*B23B 31/26*  (2006.01)
*B23Q 3/157*  (2006.01)
(Continued)

(52) U.S. Cl.
CPC ............ *B23B 31/261* (2013.01); *B23Q 3/157* (2013.01); *B25B 23/0035* (2013.01);
(Continued)

(58) Field of Classification Search
CPC ............... B23B 31/261; B23B 45/006; B23B 2260/078; B25B 23/0035; B25B 33/005;
(Continued)

(56) References Cited

U.S. PATENT DOCUMENTS 2,162,359 A * 6/1939 Rhinevault ......... B25B 23/0035
425/269
4,962,682 A * 10/1990 Rose ................... B25B 23/0021
81/177.85
(Continued)

FOREIGN PATENT DOCUMENTS

CH          705122 A1    12/2012
CN       202429286 U     9/2012
(Continued)

OTHER PUBLICATIONS

Chinese Office Action, dated Aug. 2, 2022. pp. 1-9.
(Continued)

*Primary Examiner* — Eric A. Gates
(74) *Attorney, Agent, or Firm* — BOND, SCHOENECK & KING, PLLC; George R. McGuire

(57) ABSTRACT

The invention relates to a drive device for clamping and releasing a tool in the tool holding fixture of a tool holder. The drive device according to the invention prevents incorrect operation; said drive device can be operated manually or by a handling robot and can be actively locked to the tool holder.

10 Claims, 10 Drawing Sheets

(51) Int. Cl.
  *B25B 23/00* (2006.01)
  *B23B 45/00* (2006.01)
  *B25B 33/00* (2006.01)
(52) U.S. Cl.
  CPC ....... *B23B 45/006* (2013.01); *B23B 2260/078* (2013.01); *B25B 33/005* (2013.01); *Y10T 279/1087* (2015.01)
(58) Field of Classification Search
  CPC .............. B23Q 3/157; Y10T 279/1087; Y10T 279/3431
  See application file for complete search history.

(56) References Cited

U.S. PATENT DOCUMENTS

| | | | |
|---|---|---|---|
| 5,069,585 A | 12/1991 | Wenz, Jr. | |
| 5,485,769 A | 1/1996 | Olson et al. | |
| 5,531,140 A * | 7/1996 | Chow | B25B 23/0035 81/177.85 |
| 6,092,441 A | 7/2000 | Jarvis | |
| 6,363,819 B1 * | 4/2002 | Li | B25B 15/02 81/439 |
| 6,367,356 B1 * | 4/2002 | Stepp | B25B 23/0035 81/177.2 |
| 6,840,142 B2 * | 1/2005 | Cheng | B25B 23/0021 81/177.85 |
| 6,868,758 B2 * | 3/2005 | Chen | B25B 15/001 81/62 |
| 7,062,997 B2 * | 6/2006 | Hu | B25B 23/0035 81/177.85 |
| 8,146,461 B1 * | 4/2012 | Su | B25B 23/0035 81/177.85 |
| 11,135,657 B2 * | 10/2021 | Fautz | B23B 31/2012 |
| 11,192,190 B2 * | 12/2021 | Su | B23B 31/18 |
| 2003/0041698 A1 * | 3/2003 | Chi | B25B 23/0014 81/125 |
| 2003/0131692 A1 * | 7/2003 | Huang | B25B 13/463 81/60 |
| 2011/0091268 A1 * | 4/2011 | Hu | B25B 13/00 403/33 |
| 2014/0260826 A1 | 9/2014 | Eggert et al. | |

FOREIGN PATENT DOCUMENTS

| | | | | |
|---|---|---|---|---|
| CN | 102829037 A | | 12/2012 | |
| DE | 29814619 U1 | * | 1/1999 | ......... B25B 23/0014 |
| DE | 20217872 U1 | * | 2/2003 | ......... B25B 23/0021 |
| DE | 10319796 A1 | * | 11/2004 | ........... B23B 31/204 |
| DE | 202008008509 U1 | * | 10/2008 | ......... B25B 15/001 |
| DE | 202010008393 U1 | * | 2/2011 | ......... B25B 15/001 |
| DE | 102010052884 A1 | | 6/2012 | |
| DE | 202014100227 U1 | * | 3/2014 | ......... B25B 23/0014 |
| DE | 202016106638 U1 | * | 1/2017 | |
| EP | 1431003 A1 | | 6/2001 | |
| EP | 1938927 A2 | | 7/2008 | |
| EP | 2529865 A1 | | 1/2012 | |
| EP | 3263252 A2 | | 1/2018 | |
| EP | 3870402 B1 | | 2/2022 | |
| JP | 2002292538 A | | 10/2002 | |
| JP | 3193709 U | | 10/2014 | |
| JP | 2018001341 A | | 1/2018 | |
| KR | 200315610 Y1 | * | 6/2003 | |
| WO | WO-2006129500 A1 | * | 12/2006 | ......... B23B 31/1071 |
| WO | 2012104671 A2 | | 8/2012 | |

OTHER PUBLICATIONS

JP Office Action, App No. 2021-568641, dated Sep. 20, 2022, entire document.
English Translation of Japanese Office Action, dated Mar. 14, 2023. pp. 1-11.
International Preliminary Report on Patentability, dated May 4, 2021, pp. 1-24.
International Search Report and Written Opinion for International Application PCT/EP2020/064711, pp. 1-7. Mailing date of search report, Aug. 10, 2020.
Chinese Office Action, Application No. 202080036568.2, dated Jan. 20, 2023, pp. 1-7.
Translated International Search Report, PCT/EP2020/064711 filed May 27, 2020. Mailing date of Search Report Aug. 10, 2020.
International Preliminary Report on Patentability for International Application No. PCT/EP2020/064711, filed May 27, 2020.

* cited by examiner

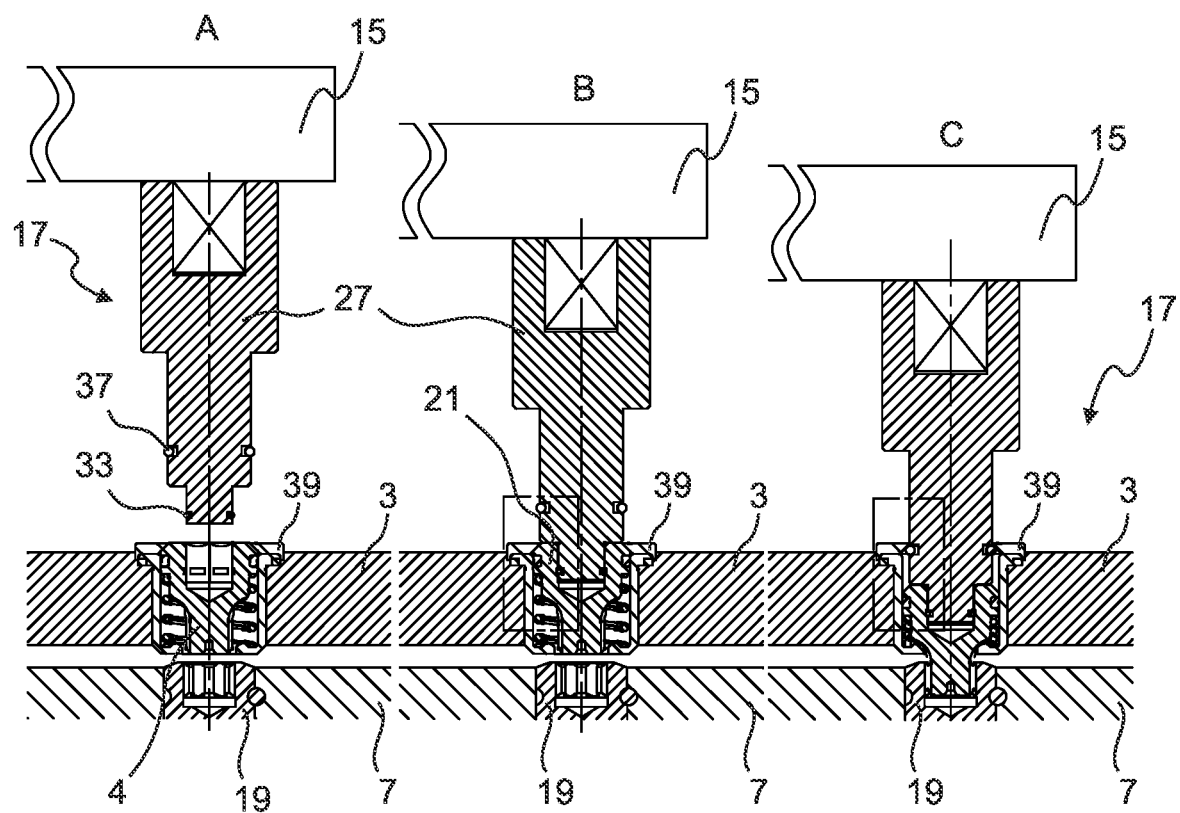
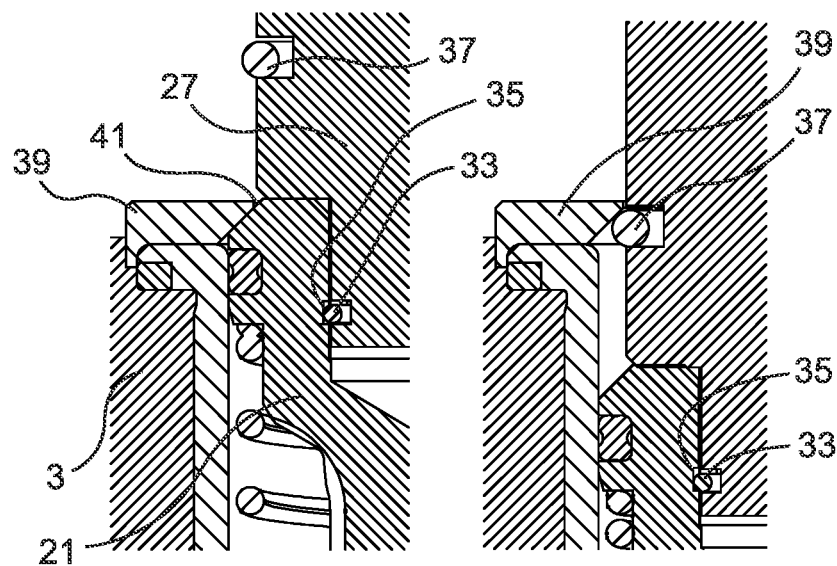
Fig. 4
Detail    Detail

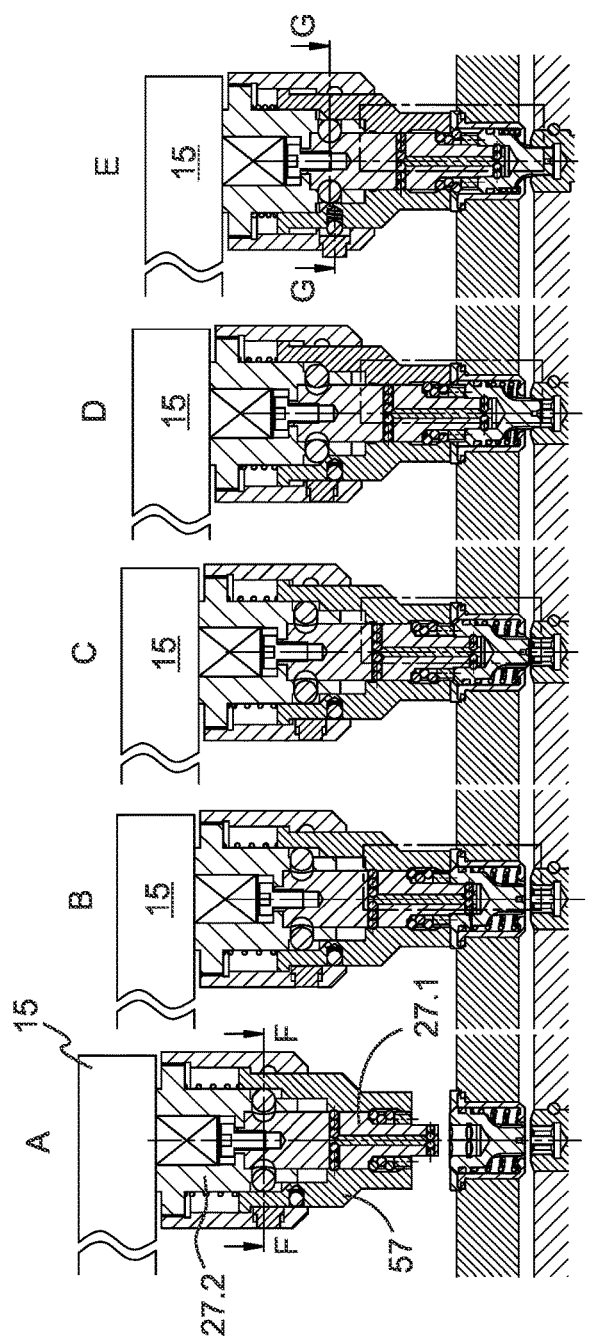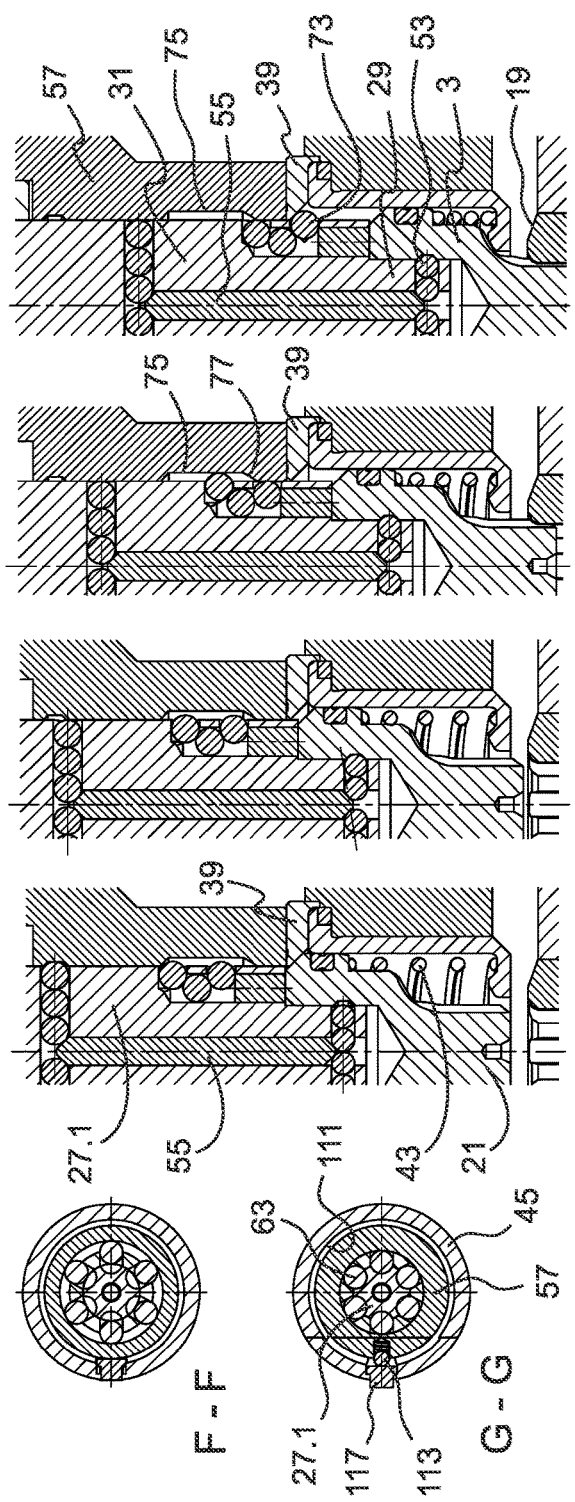
Fig. 8

OPERATING KEY FOR STATIONARY AND DRIVEN TOOL HOLDERS

CROSS REFERENCE TO RELATED APPLICATIONS

This is a National Stage Application filed under 35 U.S.C. 371 based on International Patent Application No. PCT/EP2020/064711, filed on May 27, 2020, which claims priority to German Patent Application 10 2019 115 386.7 filed Jun. 6, 2019. The entire disclosures of each of the foregoing are hereby incorporated herein by reference in their entireties.

DESCRIPTION

Driven and stationary tool holders have been on the market for many years. In FIG. 1, an isometric drawing of such a tool holder, which in this case is driven, is shown as an example. This tool holder 1 comprises a housing 3 having a shaft 5 and a spindle 7.

The housing 3 of the tool holder 1 is fastened to a turret (not shown) of a machine tool by means of screws. The spindle 7 is driven by a drive shaft of the turret via a dihedron or in some other way.

A tool, for example a drill or an end mill, is received and clamped in the spindle 7. The tool can be clamped either directly or via a tool adapter. In order to clamp a tool or a tool adapter (both not shown) in the spindle 7, among other things an operating device 9, which is explained in more detail in connection with FIG. 2, is provided in the tool holder 1.

In the embodiment shown, the operating device 9 comprises a hexagon socket 11 which interacts with an operating key 13. A hexagon bit wrench (colloquially also referred to as a hex key) is usually used as the operating key. Of course, the design is not limited to a hexagon socket 11. Further embodiments which are suitable for the transmission of torques are always conceivable (e.g., hexagon bit, hexalobular profiles, square profiles, dihedral profiles, polygonal profiles, front drivers, etc.).

FIG. 1 shows an embodiment of an operating key 13 according to the invention. The operating key 13 according to the invention comprises a torque-providing apparatus. In this embodiment, the operating key 13 comprises a torque wrench 15 (=torque-providing apparatus) and a drive and locking unit 17 according to the invention. The torque-providing apparatus can be, for example, a (rigid) lever arm, a screwdriver, a torque wrench, an electromechanically, pneumatically or hydraulically driven wrench or an industrial robot. The drive and locking unit 17 is driven by the torque wrench 15 or the torque-providing apparatus. The drive and locking unit 17 according to the invention is compatible with a wide variety of drives and can also be integrated into a fully automated production environment.

The drive and locking unit 17 according to the invention is illustrated and explained in detail below with reference to FIGS. 3 to 10. In the embodiment shown in FIG. 1, said unit has, on its top, a slot which has a square cross section and which cooperates with a square of the torque wrench 15 in a manner known per se. At the lower end of the drive and locking unit 17 (hereinafter drive unit 17) a hexagon bit is formed which interacts with the hexagon socket 11 of the driven tool holder. The lower end of the drive unit 17 has to interact with the counterpart (here the hexagon socket 11) of the driven tool holder 1 such that the torque required for releasing and clamping the tool in the spindle 7 of the tool holder 1 can be securely transmitted.

In the upper part of FIG. 2, a longitudinal section through the driven tool holder 1 is shown.

The spindle 7 is rotatably mounted in the housing 3. In the tool holder 1 shown by way of example, the spindle 7 has a tool holding fixture for tools and a clamping system for tools (drills, end mills, etc.), which has been offered and sold under the trade name "Coromant Capto" for several decades. The "Coromant Capto" tool holding fixture in the spindle 7 of the tool holder 1 is a polygon. This clamping system comprises an eccentric clamp 19 which is arranged in the spindle 7. The eccentric clamp 19 is operated via the operating device 9. As can be seen from FIG. 2, the operating device 9 comprises a bolt 21. This bolt 21 is rotatably mounted in the housing 3. In addition, with the aid of the operating key 13, the bolt 21 can be moved relative to the housing toward the spindle 7. Similar clamping systems are also available in combination with other tool holding fixtures such as HSK, KM and many others.

At its lower end in FIG. 2, the bolt 21 has a hexagon bit which is compatible with a hexagon socket 23 of the eccentric clamp 19. The movement of the bolt 21 toward the eccentric clamp 19 creates a form-fitting connection between the bolt 21 and the eccentric clamp 19 via the hexagon bit and the hexagon socket 23. The torques required for releasing and clamping the tool in the spindle 7 are transmitted thereby. Instead of the hexagon bit and the hexagon socket 23, a hexalobular bit and a hexalobular socket or a dihedron and a transverse groove can be provided for torque transmission between the bolt 21 and the eccentric clamp 19. Further interfaces for torque transmission between the bolt 21 and the eccentric clamp 19 are also possible.

At the upper end of the bolt 21 in FIG. 2, the hexagon socket 11 already explained in connection with FIG. 1 is provided. A drive device 17 is inserted into this hexagon socket 11 if necessary. The drive device 17 can be supplemented with a lever or a torque wrench 15 to form an operating key 13 or can be driven by a wrench or an industrial robot.

Since the eccentric clamp 19 rotates together with the spindle 7 while a workpiece is being machined, but the bolt 21 is received in the housing 3 and thus cannot rotate therewith, a compression spring 43 is provided which ensures that the bolt 21 is normally not in engagement with the hexagon socket 23 of the eccentric clamp 19. "Normal" is when the eccentric clamp 19 is not intended to be opened or closed and no drive device 17 and no operating key 13 are inserted into the operating device 9. The "normal" case is shown in FIG. 2.

If the eccentric clamp 19 is intended to be opened or closed, the drive device 17 has to be inserted into the hexagon socket 11 of the bolt 21. The bolt 21 has to be moved toward the eccentric clamp 19 against the force of the spring 43 until the hexagon bit of the bolt 21 has moved fully into the hexagon socket 23 of the eccentric clamp 19. The torques required for clamping or releasing the tool holding fixture can then be securely transmitted from the operating key 13 to the eccentric clamp 19.

In the lower part of FIG. 2, a longitudinal section through a tool holder 1 with a stationary tool is shown. In connection with the invention, the main difference from the tool holder shown in the upper part of FIG. 2 is that the eccentric clamp 19 is received and supported in the housing 3 and not in the spindle 7. The housing 3 is here connected to a turret 120

(for example by means of screws (not shown)) and, in other embodiments (not shown), can also be in one piece.

The stationary tool is clamped and released in exactly the same way as described above in connection with the driven tool holder 1.

The invention is not limited to driven tool holders 1 of this type. There is a large number of other driven and stationary tool holders 1 on the market, which in principle are constructed in the same way. Their operating devices also have a rotatable bolt which is slidable in the longitudinal direction and which, if necessary, can be inserted by a projection into a depression in a clamping element of the spindle or another fixed tool holding fixture and, in this state, transmits the torque required for clamping and releasing from the operating key to the clamping element. Examples in this context are EP 3 263 252 A2, DE 10 2010 052 884 A1 from Benz GmbH Werkzeugsysteme and EP 2 529 865 A1 from Su-Matic Corp.

If, for example, a machine operator using the operating key 13 does not insert the bolt 21 deep enough into the hexagon socket 23 of the eccentric clamp 19 before the eccentric clamp 19 is opened or closed, the permissible surface pressure between the only half moved-in hexagon bit of the bolt 21 and the hexagon socket 23 of the eccentric clamp can be exceeded. As a result, the tool holder 1 is damaged. From EP 3 263 252 A2 (Alpstool), an approach for overcoming the disadvantages of the prior art is known in which locking means are integrated into the operating device of the tool holder.

From EP 3 263 252 A2 (Alpstool), an approach for overcoming the disadvantages of the prior art is known in which locking means are integrated into the operating device of the tool holder.

From US 2014/0260826 A1, U.S. Pat. Nos. 6,092,441 and 5,485,769, adapters are known which couple what is referred to as a ratchet and a nut to one another.

The aim of the invention is that of providing an operating key which makes releasing and clamping a tool of a tool holder easier, more reliable and more secure (compared with a conventional hexagon bit wrench). Incorrect operation and the resulting damage are intended to be effectively prevented. This is particularly important because there is often only relatively little space available in the work areas of turning and machining centers and the visibility of the operating device 9 of the tool holder 1 is not always optimal. Sometimes the machine operator cannot see the operating device of the tool holder 1 at all.

This aim is achieved according to the invention by a drive and locking unit comprising a pin, a torque-transmitting first portion of the pin having first locking means and a second portion of the pin having second locking means.

First and second locking means are activated one after the other when the drive and locking device according to the invention is inserted into the operating device of the tool holder.

In this way, it is not only possible to lock the drive and locking unit, in the region of the torque-transmitting portion of the pin, to the counterpart (i.e., a bolt) of a tool holder in a form-fitting or friction-locked manner, but it is also possible, with the aid of the second locking means, to lock the operating key to the housing of a tool holder or of a turret connected thereto and to temporarily fasten said key to said housing or said turret. In some embodiments of the invention, the machine operator can let go of the operating key in the locked state without said key falling out of the tool holder. This is particularly advantageous when the tool clamped in the tool holder is to be removed or a new tool is to be inserted. The machine operator can then easily use both hands. When the tool has been inserted in the tool holder, the machine operator operates the operating key according to the invention and clamps the previously inserted tool in the tool holder. This advantage also comes into play when the drive device is operated automatically (e.g., by means of an industrial robot or another handling device) and not manually and/or the tool change takes place via an industrial robot or another handling device.

The drive device according to the invention leads to more reliable and less error-prone operation of the operating device of the tool holder since, by locking the drive device to the housing of the tool holder or turret, it is ensured that the drive device has been properly inserted into the tool holder and, as a result, the bolt of the tool holder also fully engages in the eccentric clamp of the tool holder.

Since the first and the second locking means each give tactile feedback when they snap in one after the other, the machine operator receives two instances of feedback one after the other when he inserts the drive and locking device according to the invention into the operating device of the tool holder. This reliably prevents incorrect operation and consequential damage resulting therefrom (damage to the tool holder, to the tool if it is not correctly clamped, and/or to the workpiece).

Due to the double snapping in or locking, the machine operator receives tactile and visual feedback when the operating key, and, together therewith, the bolt of the operating device, has moved fully into the eccentric clamp of the spindle. In the case of automation, the two snap-in functions can be monitored by sensors. If the operating key is to be removed from the tool holder, it is also ensured that the bolt of the tool holder is pulled out of the eccentric clamp via the locking element of the drive device according to the invention before the first lock is released. In the prior art, only the spring 43 ensures that the bolt 21 is pulled out of the eccentric clamp 19. The bolt is thus prevented from getting stuck in the eccentric clamp. Overloading or incorrect operation of the tool holder or the operating key are thus eliminated. Damage to the tool holder due to incorrect handling of the operating key or unintentional sticking of the bolt in the eccentric clamp is also eliminated, and therefore the service life of the tool holder is increased. Due to the simplified operation, less qualified machine operators can also work without errors and the system can be automated more easily.

By suitably designing the first locking means, as shown by way of example in all embodiments, 100% compatibility of the hexagon socket 11 of the bolt 21 with standard operating tools (e.g., hexagon wrench) can be achieved. This makes it possible for the machine operators to also be able to use conventional operating tools at any time instead of the drive device according to the invention, and prevents damage to the bolt 21 of the operating device 9 from occurring on the tool holder due to incorrectly selected operating tools.

In an advantageous embodiment of the invention, the first locking means and/or the second locking means are in the form of spring rings or spring-loaded machine elements (e.g., balls, pegs). The first locking means of the drive device and the bolt of the tool holder form a releasable snap connection, with bending snap arm connections or ring snap connections being particularly advantageous. These embodiments are very easy to control in terms of production and are inexpensive. Nevertheless, they offer the advantages mentioned above.

In a further advantageous embodiment of the invention, the pin extends axially slidably in a housing, the first locking means being arranged in a first radial bore and in a second radial bore and interacting in at least one connecting bore by means of transmitting machine elements. The transmitting machine elements can be, for example, balls, pegs, or also a fluid (for example grease), which interact with the locking means and couple the positions of the first locking means (e.g., balls) in both radial bores. The positions of the locking means in the radial bores are coupled to one another by the transmitting machine element(s) such that either at least one locking means in the first radial bore or at least one locking means in the second radial bore projects slightly beyond the pin in a radial direction. In a guide bore in the housing, a recess is provided which, when the first locking means is in an open position, receives at least one locking means of the second radial bore.

If the pin is now slid relative to the housing, then the recess moves away from the second radial bore and the locking means are forced by the guide bore in the housing into the second radial bore. As a result, at least one, but usually two locking means are pressed radially outward from the first radial bore via the transmitting machine elements in the bore connecting the radial bores. These locking means enter the depressions in the bolt of the operating device of the tool holder and thus lock the torque-transmitting first portion of the pin to the bolt of the operating device of the tool holder. In this way, a form-fitting lock between the pin and bolt is ensured.

This principle can also be applied to the second locking device (between the pin and the housing of the tool holder).

The second locking device can also be implemented with the aid of expanding jaws. Such an embodiment is particularly compact and very robust.

In a further advantageous embodiment of the invention, the pin is formed in two parts. The drive end of the pin, i.e., where, for example, a torque wrench, wrench or other torque-providing apparatus can be inserted, is formed on a second part of the pin and the output end is formed on a first part of the pin. The first part and the second part of the pin are arranged coaxially with one another in the housing and are rotatably mounted and extend axially slidably. A switchable coupling is provided between the first part and the second part of the pin. This coupling is engaged when the pin has moved far enough in the axial direction relative to the housing. This ensures that torques can be introduced by the operating key into the operating device of the tool holder 1 only when the torque-transmitting portion of the pin has moved far enough into a complementary slot in the bolt. This also ensures that the hexagon bit or hexalobular bit of the bolt is sufficiently deeply inserted into the complementary hexagon socket or hexalobular socket of the eccentric clamp. The torques required for clamping or releasing the eccentric clamp can hereby be transmitted securely and without damaging individual components.

In a structurally particularly advantageous embodiment of a switchable coupling between the two parts of the pin, the switchable coupling comprises at least one depression in the first part and at least one transverse bore in the second part of the pin, the depressions(s) is/are arranged in an extension of the transverse bore(s), in each case a ball is provided in the transverse bore, and a region having a widened diameter is provided in the housing. This allows the ball to move outward such that it does not protrude into the inner diameter of the second part. The locking balls are pressed into the depressions in the first part by a run-on bevel at the end of the region having a widened diameter when the pin has entered far enough into the operating device of the tool holder 1. When the locking balls have entered the depressions, the coupling is closed. In this embodiment, a portion of the second part of the pin surrounds the first part of the pin such that the depression(s) in the first part and the transverse bore(s) can be arranged in alignment with one another.

In another advantageous embodiment of the invention, the drive device has a locking-clamping mechanism. Locking-clamping mechanisms are available in a wide variety of designs. The best-known application of a locking-clamping mechanism is a ballpoint pen. In that case, the locking-clamping mechanism is used to either make the cartridge disappear in the housing of the ballpoint pen or, if the ballpoint pen is to be used, to lock the cartridge relative to the housing such that the tip of the cartridge projects from the housing. A particularly advantageous form of a locking-clamping mechanism is shown in FIGS. 9 and 10.

The various first locking means according to the invention, second locking means, switching couplings and locking-clamping mechanisms each represent aspects of the invention that can be used independently of one another in an operating key and combined. They can be used individually or in any combination with one another.

The aim mentioned at the outset is also achieved by a method having the features of the additional independent claim. Said method is highly advantageous for a fully automated tool change because the release of the tool, the changing of the tool and the subsequent clamping of the tool can be carried out one after the other by an industrial robot.

Further advantages and advantageous embodiments of the invention can be found in the following drawings, the description thereof and the claims.

BRIEF DESCRIPTION OF THE DRAWINGS

In the drawings:

FIGS. 3 and 4 show various representations of a first embodiment of a drive device according to the invention (solution A);

FIGS. 7 and 8 show various representations of a third embodiment as well as (solution C)

DETAILED DESCRIPTION OF THE EMBODIMENTS

Figure 1:
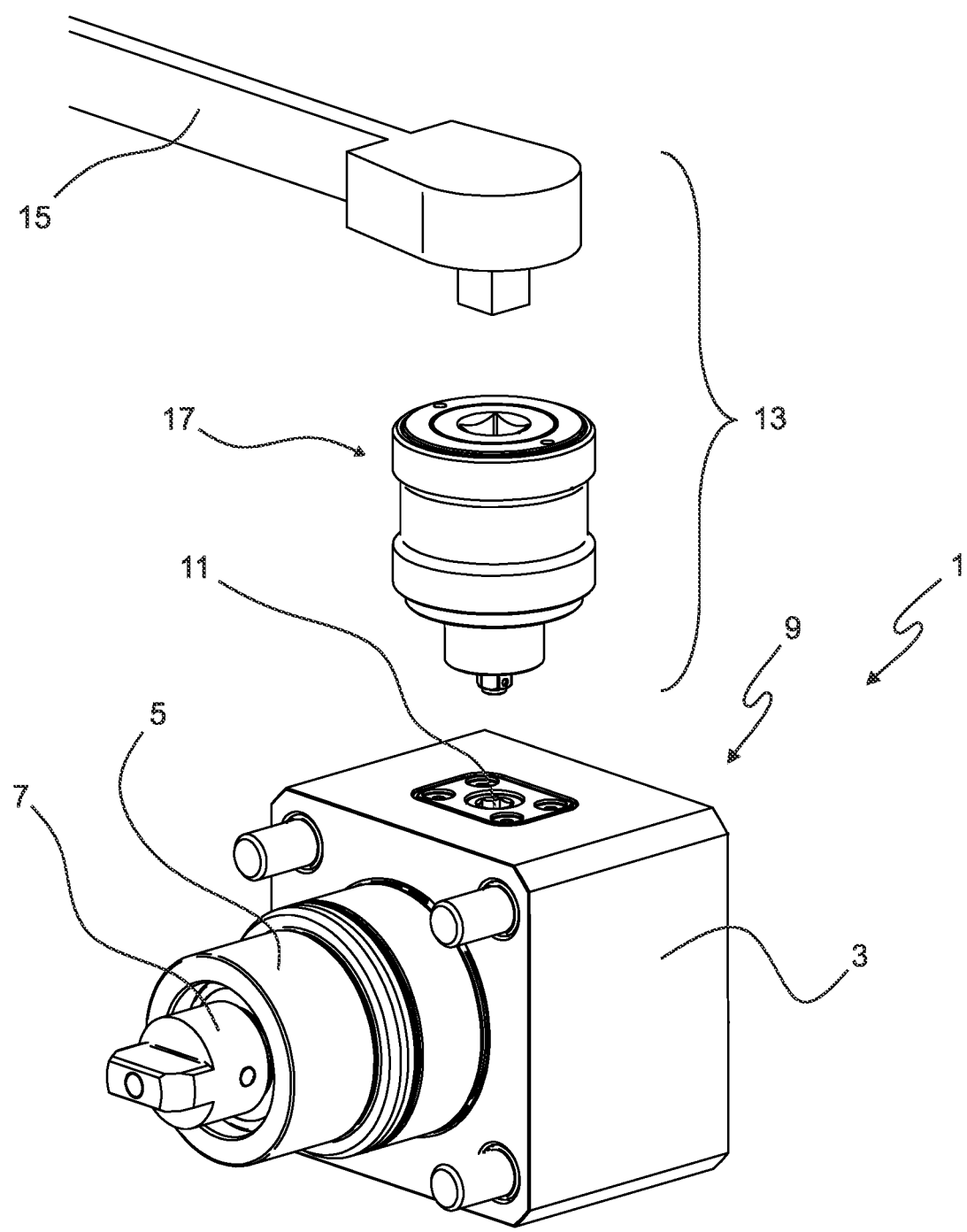
FIG. 1 shows a driven tool holder with an embodiment of an operating key according to the invention.
Figure 2:
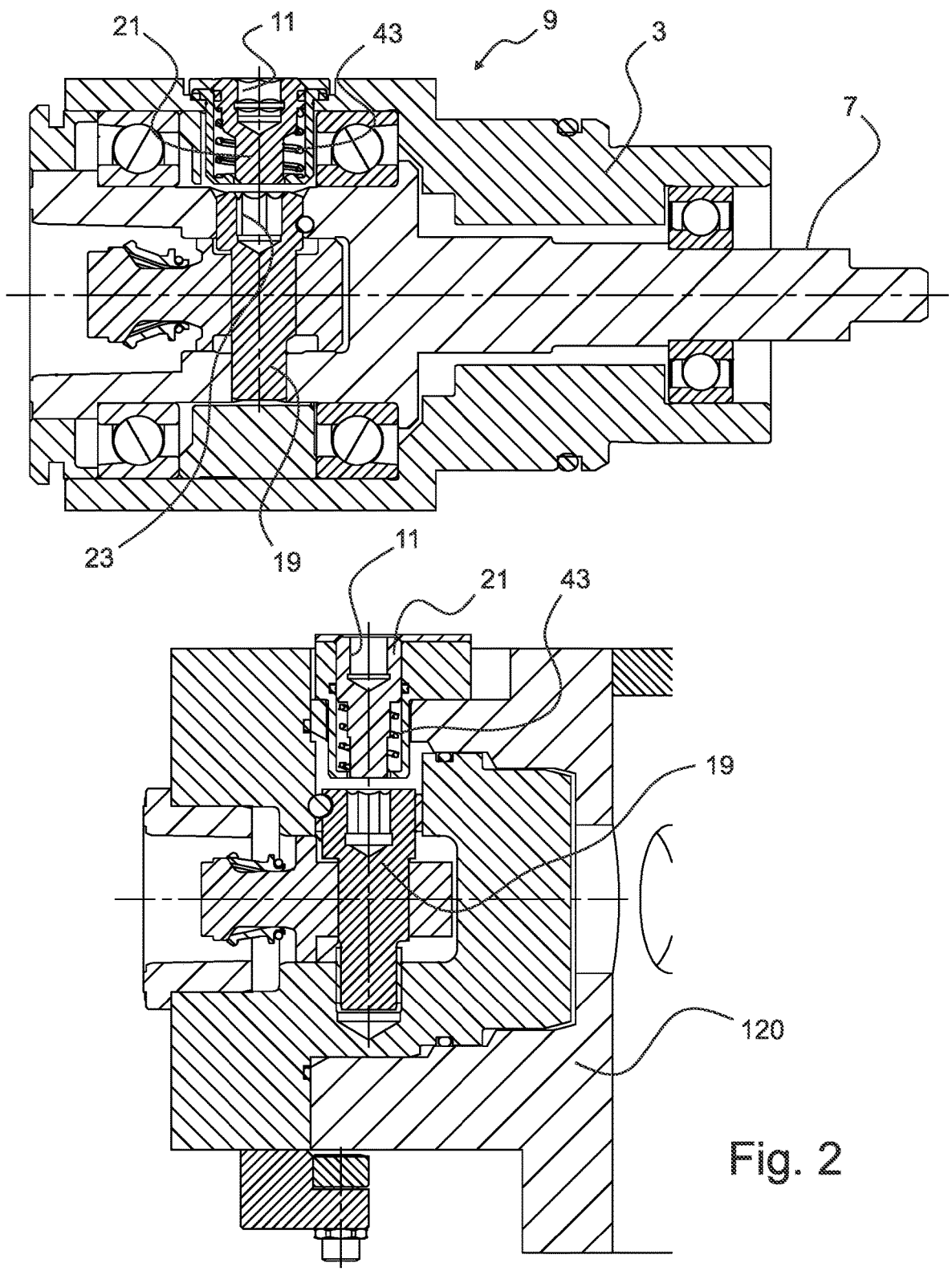
FIG. 2 shows, at the top, a longitudinal section through the driven tool holder according to FIG. 1 and, at the bottom, a longitudinal section through a stationary tool holder installed in a turret.

In the figures, for reasons of clarity, not all reference signs are entered in all figures and views. The same reference signs are used throughout for the same components.

In order to illustrate the mode of operation of the drive device 17 according to the invention, the bolt 21 and part of the eccentric clamp 19 are shown in some figures. These parts are not part of the operating key 13 or of the drive device 17 according to the invention. The interaction of the drive device 17 according to the invention with the operating device 9 of a tool holder 1 can be illustrated by the representation of the bolt 21 and the eccentric clamp 19. From this it becomes clear, among other things, that the locking means of the drive device 17 according to the invention are only activated when the drive device 17 has entered far enough into the bolt 21 of the tool holder and said tool holder has in turn entered far enough into the eccentric clamp 19. As a result, an activated locking device provides the feedback to the machine operator or an industrial robot that the torque-transmitting form-fitting connections are properly formed between the drive device 17 and the bolt 21 as well as
between the bolt 21 and the eccentric clamp 19.

They can then transmit the full torque without being damaged.

In all embodiments, a hexagon bit or a hexalobular bit is arranged at the lower end of the bolt 21. The eccentric bolt 19 has, on its upper end face in FIGS. 2 to 10 which faces the bolt 21, a complementary depression (hexagon socket or hexalobular socket). This makes it possible to transmit torques between the bolt 21 and the eccentric clamp 19 when the output end of the bolt 21 has entered the hexalobular socket of the eccentric clamp 19.

The representation of a hexagon socket 11 in the bolt 21 in combination with the operating key 13 according to the invention is used for illustration purposes only. The invention is not limited to the tool holder 1 having a hexagon socket 11 in the bolt 21 and a complementary hexagon bit on the operating key 13.

In all of the illustrated embodiments, the drive and locking unit 17 according to the invention is represented by a torque wrench 15 (=torque-providing apparatus). Instead of the torque wrench 15, it is also possible to provide a simple lever or a torque-generating wrench that is driven in some other way (mechanically, electrically, pneumatically, hydraulically, etc.). The drive and locking unit 17 according to the invention and the drive-end torque-providing apparatus can also be combined in one assembly.

Figure 3:
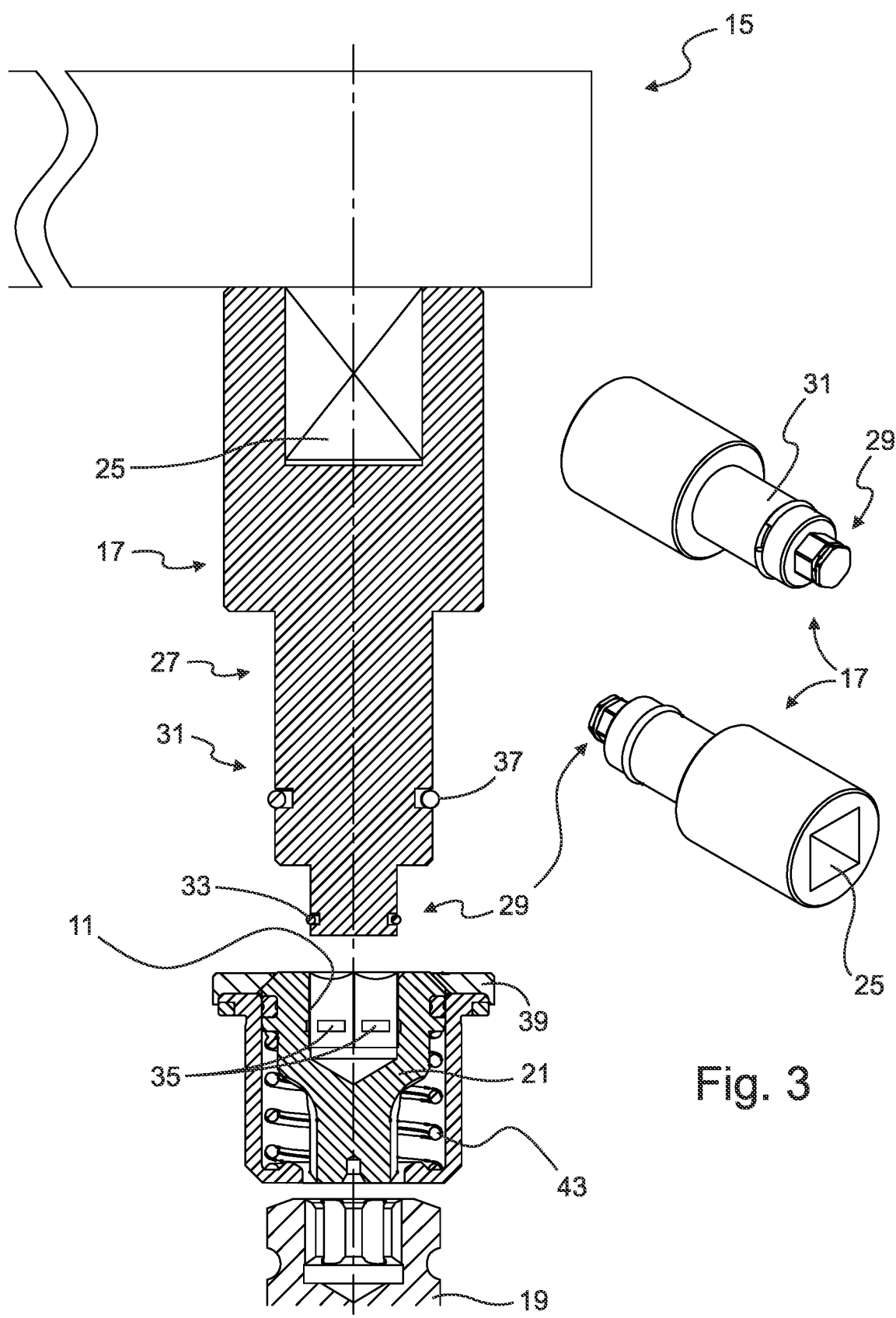

In the upper part of FIG. 3, an operating key 13 is shown which, similarly to FIG. 1, consists of two assemblies. The upper part is in the form of a torque wrench 15 which is inserted into a drive device 17 according to the invention. This can be done via a square 25 in a manner known per se. It goes without saying that the torque wrench 15 and the drive device 17 according to the invention can also be formed in one piece. In a particularly simple embodiment, instead of the torque wrench 15, a lever is provided which is connected to the drive device 17 for conjoint rotation.

The first embodiment of a drive device 17 according to the invention shown in FIG. 3 consists of a pin 27 having a first portion 29 and a second portion 31. In this embodiment, the region of the first torque-transmitting portion 29 is in the form of a hexagon bit or hexalobular bit, which is compatible with the hexagon socket 11 or hexalobular socket of the bolt 21 of the tool holder 1. The region of the second portion 31 can be in the form of a cylinder.

In the isometric drawings of FIG. 3, it can be clearly seen that the first portion 29 is in the form of a hexagon bit and that a square socket 25 is formed at the opposite end of the pin 27. The torque wrench 15, a simple lever or another torque-providing apparatus is inserted into this square socket 25.

In the region of the first portion 29, first locking means are provided, specifically a first spring ring 33. The spring ring 33 is received in a groove such that, in the relaxed state, said ring projects beyond the surfaces of the hexagon bit of the first portion 29. The groove is also dimensioned such that the spring ring 33 can move radially inward when the hexagon bit is inserted into the hexagon socket 11 of the bolt 21.

Depressions 35 are formed in the hexagon socket 11 of the bolt 21. Said depressions are positioned such that the spring ring 33 rebounds into the slots 35 in the bolt 21 when the first portion 29 of the drive device 17 has been fully inserted into the hexagon socket 11 of the bolt 21.

As a result, the machine operator receives a first instance of tactile feedback, and a resilient, but nevertheless rigid connection is created between the hexagon bit of the pin 29 and the hexagon socket 11 of the bolt 21. In other words, the drive device 17 according to the invention snaps resiliently into the hexagon socket 11 of the bolt 21 when the first portion 29 of the pin 27 has fully entered the hexagon socket 11. This makes it possible to transmit axial forces between the drive device 17 according to the invention and the bolt 21 when the drive device 17 is pulled out of the operating device 9 of the tool holder 1. As a result, two forces, namely that of the compression spring 43 and the axial force applied via the operating key 3, act on the bolt 21 when the operating key 13 is pulled out of the operating device 9 of the tool holder 1. These forces have the very reliable effect that the bolt 21 is pulled out of the eccentric clamp 19 and the spindle 7 can rotate freely again. The risk of the bolt 21 remaining unintentionally in the eccentric clamp 19 is significantly reduced. In this embodiment, the first spring ring 33 is the first locking device.

In the second portion 31 of the pin 27, a second spring ring 37 is formed; in this embodiment said second spring ring is the second locking device.

This second spring ring 37 is used to lock the operating device 9 according to the invention to a guide plate 39 of the driven tool holder 1. This gives the machine operator a second instance of tactile feedback. Instead of the spring rings 33, 37, other snap connections between the drive device 17 and the tool holder 1 can also be used.

In the enlarged details of FIG. 4, the guide plate 39 (of the operating device 9) is shown in partial section and enlarged. The guide plate 39 has a through-opening 41 in the middle. The second portion 31 of the pin 27 is dimensioned such that it passes through the through-opening 41. In its relaxed position, as shown in FIG. 3, the second spring ring 37 is slightly larger in diameter than the through-opening 41 in the guide plate 39. This means that, when the drive device 17 is inserted into the operating device 9 of the tool holder 1, the second spring ring 37 is briefly compressed when it passes through the through-opening 41. It then springs back again and in this way latches or locks the drive device 17 to the guide plate 39 or the tool holder 1. This gives the machine operator a second instance of tactile feedback.

These processes are shown in FIG. 4. The spindle 7, the upper part of the eccentric clamp 19, the housing 3 and the bolt 21 located therein, together with the guide plate 39 and the compression spring 43, are shown in each case. The compression spring 43 presses the bolt 21 away from the spindle 7 (upward in FIG. 4). View "A" largely corresponds to the situation shown in FIG. 3. The operating key according to the invention is not in engagement with the bolt 21 of the driven tool holder 1.

In view "B," the drive device 17 has already entered a little into the bolt 21 and precisely so far that the first portion 29 of the pin 27 has fully entered the hexagon socket 11 of the bolt 21. In this position, the first spring ring 33 and the slot/depressions 35 in the hexagon socket 11 are at the same level and the first spring ring 33 has entered the depressions 35. The first locking device is active.

In the position shown in "B," the second spring ring 37 of the pin 27 is still above the guide plate 39.

In the position shown in "C," the drive device 17 according to the invention has been moved further downward. The bolt 21 has moved toward the eccentric clamp 19 and the hexagon bit of the bolt 21 has moved into the hexagon socket of the eccentric clamp 19. As a result, torque transmission between the drive device 17 or the torque wrench 15 and the eccentric clamp 19 is possible.

In this position, the second spring ring 37 is located below the guide plate 39 and thereby locks the drive device 17 in the housing 3 of the driven tool holder 1. In other words, the drive device 17 is rigidly connected to the tool holder 1 and the second locking device is active. As a result, the operating key 13 remains on the tool holder 1, even if the machine operator lets go of the operating key 13.

Only when the machine operator actively pulls the torque wrench 15 (upward in FIG. 4) are the drive device 17 and the bolt 21 released again. As already mentioned, when pulling the drive device 17 out of the tool holder 1, an axial force is exerted on the bolt 21 via the first spring ring 33 and the depressions 35 in the bolt 21, such that the bolt 21 is actively pulled out of the eccentric clamp 19 not only in a spring-assisted manner, but also in a manner in which it is additionally supported by this axial force.

By means of the two locking devices according to the invention (one in the form of the first spring ring 33 in combination with the depression 35 in the bolt 21 and the other due to the second spring ring 37 and the guide plate 39 in the tool holder 1), it is ensured that the machine operator can perform two checks—tactile and visual—as to whether the operating key 13 has moved fully into the tool holder 1. This is ensured when the second spring ring 37 has disappeared "behind" the guide plate 39. The full torque for clamping or releasing the eccentric clamp 19 can then be applied without causing damage inside the driven tool holder 1.

In addition, the operating key 13 is secured against unintentional falling out by means of the (second) lock between the second spring ring 37 and the guide plate 39. This is a considerable advantage in practice. When the operator has released the eccentric clamp 19, they can let go of the operating key 13 in order to remove the tool from the spindle using both hands and replace said tool with another tool. The operator then grasps the operating key 13 according to the invention again, and clamps the eccentric clamp and thus also the tool inserted into the spindle.

This is also very advantageous for a fully automated tool change because the release of the tool, the change of the tool and the subsequent clamping of the tool can be carried out one after the other by an industrial robot.

When this process is complete and the eccentric clamp 19 has been subjected to the specified torque, the operator pulls the operating key 13 out of the bolt 21. As a result, the bolt 21 is also actively pulled out of the eccentric clamp 19. When the operating key 13 has been fully pulled out of the bolt 21, it is also ensured at the same time that the bolt 21 is no longer form-fittingly connected to the eccentric clamp 19, so that the machining of a workpiece can be continued with the aid of the driven or fixed tool holder 1. Automatic error detection is also possible, so that (consequential) damage due to an incorrectly performed tool change is almost eliminated.

Figure 5:
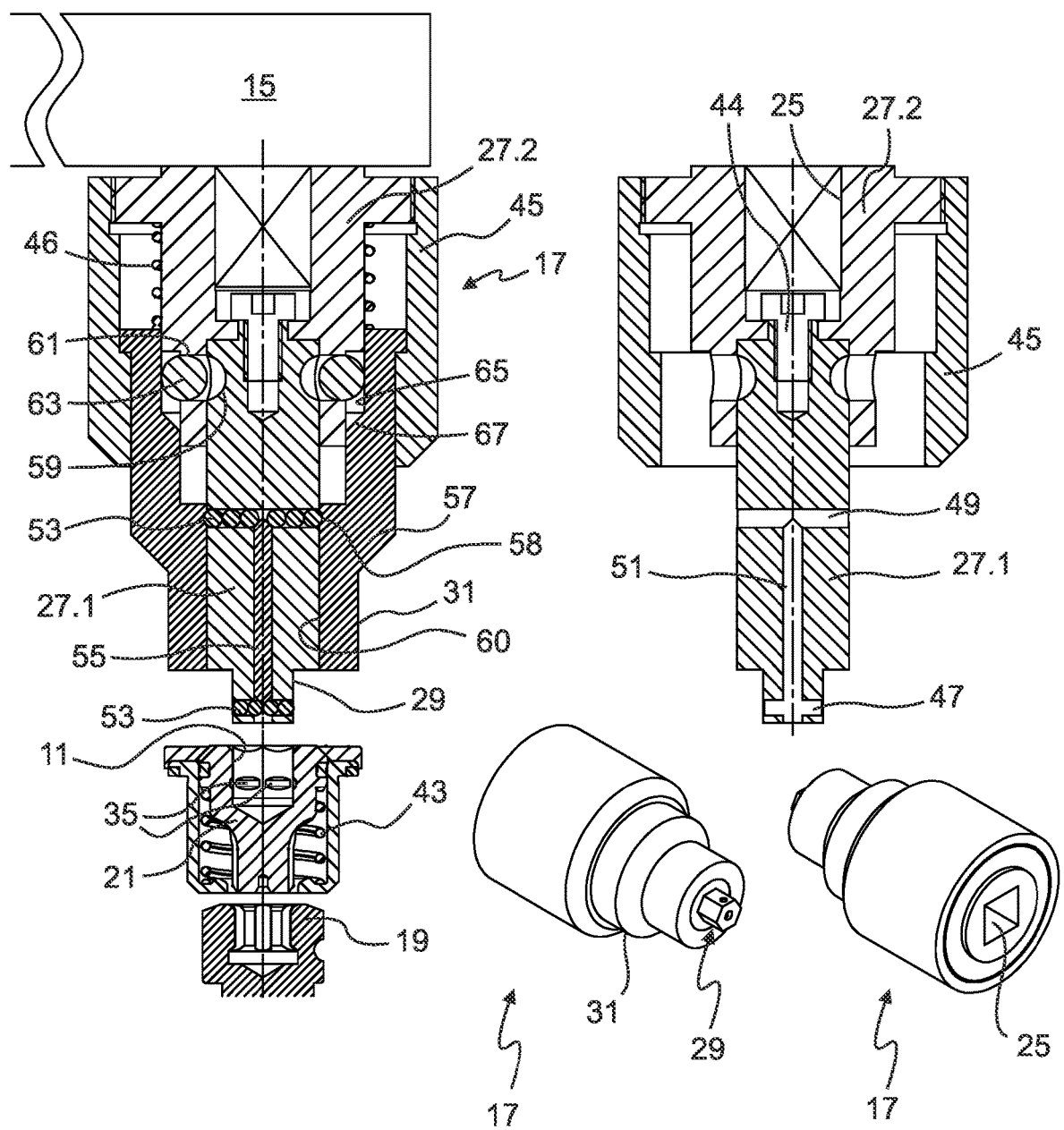
FIGS. 5 and 6 show various representations of a second embodiment (solution B)
Figure 6:
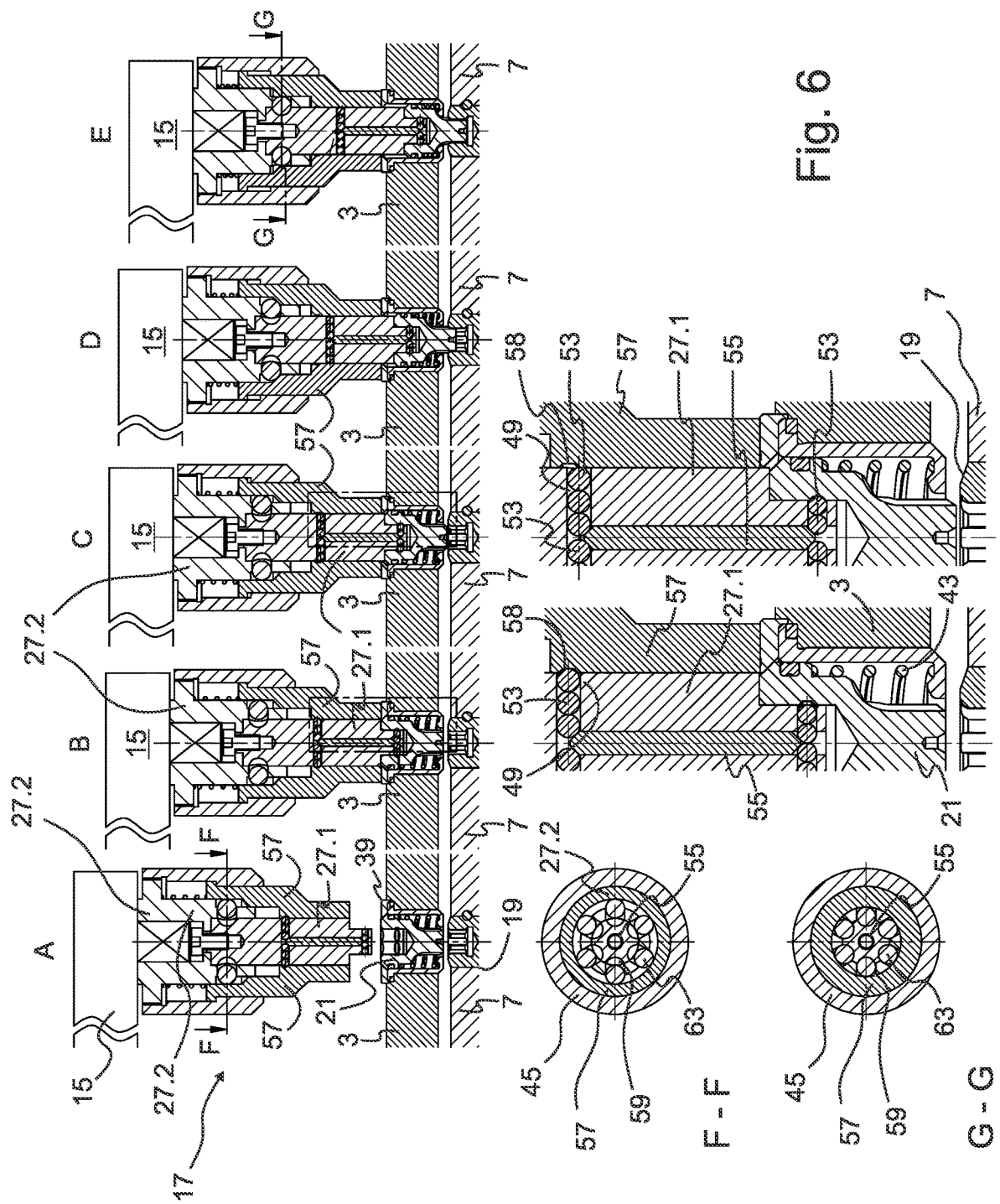

In FIGS. 5 and 6, a second embodiment of a drive device 17 according to the invention is shown in various views. Isometric views of this embodiment are shown at the bottom right in FIG. 5. The outer contour of this second embodiment can be described as a stepped cylinder. A hexagon bit is provided at one end of the stepped cylinder, while a square 25 is provided at the opposite end. In this respect, the first and the second embodiment correspond to one another.

In the upper right part of FIG. 5, a longitudinal section through the second embodiment is drawn, with only the most important components being shown. In this embodiment, the pin 27 is divided into two parts, 27.1 and 27.2. The first part 27.1 and the second part 27.2 are arranged coaxially with one another. They are interconnected by a central screw 44 such that a rotary movement of the parts 27.1 and 27.2 relative to one another is possible. In addition, the two parts are coupled to one another in the axial direction.

A sleeve 45 is screwed to the second part 27.2. The sleeve 45 is usually produced as a separate component in order to ensure easy mounting or simplify the mounting of the drive device 17. It is irrelevant for the function whether the part 27.2 and the sleeve 45 are made in one piece or in multiple parts.

A housing 57 is shown in the left-hand part of FIG. 5. The first part 27.1 and the second part 27.2 of the pin 27 are guided in a stepped longitudinal bore in the housing 57. At its lower end in FIG. 5, the sleeve 45 engages around the housing 57. An optional compression spring 46 is provided between the sleeve 45 and the housing 57. The housing 57 is also part of a switchable coupling.

In the first part 27.1 of the pin 27, a first radial bore 47 and, offset therefrom, a second radial bore 49 are provided. The two radial bores 47 and 49 are interconnected by an axial bore 51.

The first radial bore 47 is located in the region of the first portion 29 of the pin 27, while the second radial bore 49 is located in the region of the second portion 31.

As can be seen from the left-hand part of FIG. 5, first balls 53 are provided in the radial bores 47 and 49. A peg 55 is guided in the axial bore 51.

The length of the radial bores 47 and 49 and the diameter of the first balls 53 are matched to one another such that, either in the region of the first radial bore 47 or in the region of the second radial bore 49, the outer balls 53 project slightly beyond the diameter of the pin 27.

In FIG. 5, the situation is shown in such a way that the balls 53 in the first radial bore 47 are flush with the width across flats of the first portion 29, while the balls 53 in the second radial bore 49 project slightly beyond the second portion 31 of the pin 27 in the radial direction. At this level, a recess 58 is provided in the housing 57 of the drive device 17, such that the balls 53 in the region of the second radial bore 49 can project slightly beyond the second portion 31 of the pin 27 in the radial direction. The recess 58 can be clearly seen in the enlarged detail in FIG. 6.

When the pin 27 is slid relative to the housing 57 (downward in FIG. 5), the recess 58 in the housing 57 moves upward relative to the second radial bore 49. As a result, the "protruding" balls 53 are pressed by the inner wall of the housing 57 into the second radial bore 49. These balls 53 press the peg 59 toward the first radial bore 47, which in turn drives the balls 53 in the first radial bore 47 apart, such that these balls 53 project radially beyond the first portion 29 of the pin 27.

This case occurs when the hexagon bit of the first portion 29 has moved into the hexagon socket 11 of the bolt 21 and the first radial bore 49 is located at the level of the depression 35 in the hexagon socket 11 of the bolt 21. When the balls 53 project beyond the end of the first radial bore 47, a form-fitting lock is produced between the hexagon bit in the region of the first portion 29 of the pin 27 and the hexagon socket 11 of the bolt 21. In other words, in this position of the housing 57 relative to the pin 27, it is not possible to pull the pin 27 out of the bolt 21.

An embodiment of a switchable coupling in the drive device 17 is described below. The first part 27.1 of the pin and the second part 27.2 of the pin are not interconnected for conjoint rotation in the position shown in FIG. 5. I.e., it is possible to turn the second part 27.2 of the pin using the torque wrench 15 while at the same time the first part 27.1 of the pin is stationary.

According to the invention, a switchable coupling is provided between the first part 27.1 and the second part 27.2, which coupling engages when the pin 27 is moved sufficiently deeply into the hexagon socket 11 of the bolt 21 and said bolt in turn is moved sufficiently deeply into the hexagon socket of the eccentric clamp 19.

The function of a switchable coupling between the first part 27.1 and the second part 27.2 of the pin 27 is exemplified in the second embodiment with the aid of one or more circumferentially distributed (preferably dome-shaped) depressions 59 in the first part 27.1 of the pin 27 and transverse bores 61 in the second part 27.2 of the pin 27. Other switchable couplings (e.g., claw couplings, toothed couplings) can also be integrated into the drive device 17.

The guide bore 60 has a region 65 having a widened diameter. In the housing 57, the balls 63 can move outward in the region 65 due to the larger outer diameter. The outer diameter of the region 65 tapers at the end via the run-on bevel 67 down to the diameter of the guide bore 60. This run-on bevel 67 and the guide bore 60 ensure that the balls 63 are pressed into the depressions 59 when the pin 27 has moved far enough relative to the housing 57 (downward in FIG. 5).

For the balls 63, the second part of the pin 27.2 forms a type of cage, formed by the transverse bore(s) 61. As a result, the balls 63 can move substantially only radially in accordance with the course of the transverse bore 61 relative to the pin 27.2.

The transverse bores 61, the depressions 59, the balls 63, the region 65 and the adjoining run-on bevel 67 together form a switchable coupling. In FIG. 5, the coupling is open; that is, the balls 63 in the transverse bores 61 do not protrude inward beyond the transverse bore 61 and thus do not engage in the depressions 59.

In FIG. 6, this second embodiment of a drive device 17 according to the invention is shown in various positions. Here too, for reasons of clarity, not all components are provided with reference signs.

In the position labeled "A," the operating device 9 is still above the bolt 21. The bolt 21 is not in engagement with the eccentric clamp 19.

A section along the line F-F through the coupling is shown below view "A." Since the transverse bores 61 are relatively short, they have not been provided with reference signs in the section F-F.

In view "B," the first portion 29 of the operating device 9 has moved into the hexagon socket of the bolt 21. The housing 57 now abuts the guide plate 39. A relative movement between the pin 27 and the housing 57 of the operating device 9 has not yet taken place. As a result, the balls 53 in the upper radial bore 49 are still located in part in the recess 58 in the housing 57. The recess 58 can be clearly seen in the enlarged detail under views B and C of FIG. 6. The balls 53 in the first radial bore 47 are located within the portion 29 of the pin 27 and do not project therebeyond. Locking of the portion 29 or of the drive device 17 to the bolt 21 has not yet taken place.

In view "C," the pin 27 is pushed into the housing 57 by pressure on the torque wrench 15, since the housing 57 is supported on the stationary guide plate 39.

Now looking at view "C," and in particular the enlarged highlighted detail, this shows that the pin 27 has moved downward relative to the housing 57, such that the balls 53 in the second radial bore 49 had to "leave" the recess 58 and were pressed into the second radial bore 49. As a result, the peg 55 has moved downward in FIG. 6 and has pushed the balls 53 in the first radial bore 47 outward, such that the outermost balls 53 have moved into the depressions 35 in the bolt 21. Thus, the pin 27 and the bolt 21 are form-fittingly locked to one another. The relative movements between the pin 27 and the housing 57 triggered by the movement of the pin 27 into the bolt 21 and the movement of said bolt into the eccentric clamp 19 can be clearly seen if the distance between the sleeve 45 and the housing 57 is compared in representations "C" to "E."

In view "C," the bolt 21 has not yet entered the eccentric clamp 19. This situation is shown in view "D" in FIG. 6. In view "D," the coupling between the parts 27.1 and 27.2 of the pin 27 is not yet closed. This is because the balls 63 have initial contact with the run-on bevel 67, but are not yet located in the depressions 59.

If the pin 27 is slid further relative to the housing 57 (downward in FIG. 6), the run-on bevel 67 at the end of the region 65 presses the balls 63 into the depressions 59 in the first part 27.1 of the pin 27 and thus ensure a connection (coupling) for conjoint rotation between the first part 27.1 of the pin and the second part 27.2 of the pin.

This connection for conjoint rotation is only active when not only the torque-transmitting portion 29 of the pin 27 has fully entered the hexagon socket of the bolt 21, but also when the hexagon bit or hexalobular bit of the bolt 21 has fully entered the hexagon socket or the hexalobular socket of the eccentric clamp 19. The coupling according to the invention ensures that torques can only be transmitted by the torque wrench 15, via the drive device 17 according to the invention and the bolt 21, to the eccentric clamp when all the form-fitting elements are fully engaged and thus the contact surfaces intended for torque transmission (hexagon bit/hexagon socket between the bolt 21 and the eccentric clamp 19 as well as between the pin 29 and the bolt 21) are actually available. Overloading these contact surfaces and resulting damage to the tool holder are thus eliminated.

If, after clamping a tool, the drive device 17 according to the invention is pulled out of the tool holder 1 (upward in FIG. 6), then the bolt 21 is also actively pulled out of the eccentric clamp 19 (due to the locking with the pin 29).

If a simple hexagon bit wrench is used to clamp or release the eccentric clamp 19, then there is always the risk that the operator does not press the wrench down far enough, meaning that, firstly, the contact surface between the pin 29 and the hexagon socket of the bolt 21 is not fully available and, what is worse, the contact surface between the hexagon bit of the bolt 21 and the hexagon socket of the eccentric clamp 19 is not large enough.

If the torque required for clamping a tool is transmitted in such an "intermediate position," severe damage can occur by the hexalobular socket or hexagon socket deforming in the eccentric clamp 9 and/or by the bolt 21 being damaged. Both of these lead to failure of the tool holder and require costly repair of same. With the aid of the drive device 17 according to the invention or the operating key 13 according to the invention, this is more possible because, firstly, locking takes place between the pin 29 and the bolt 21 and, secondly, torque transmission between the torque wrench 15 and the eccentric clamp 19 is only possible when the form fit between the torque-transmitting portion 29 of the pin 27, the bolt 21 and the eccentric clamp 19 is fully provided.

Figure 7:
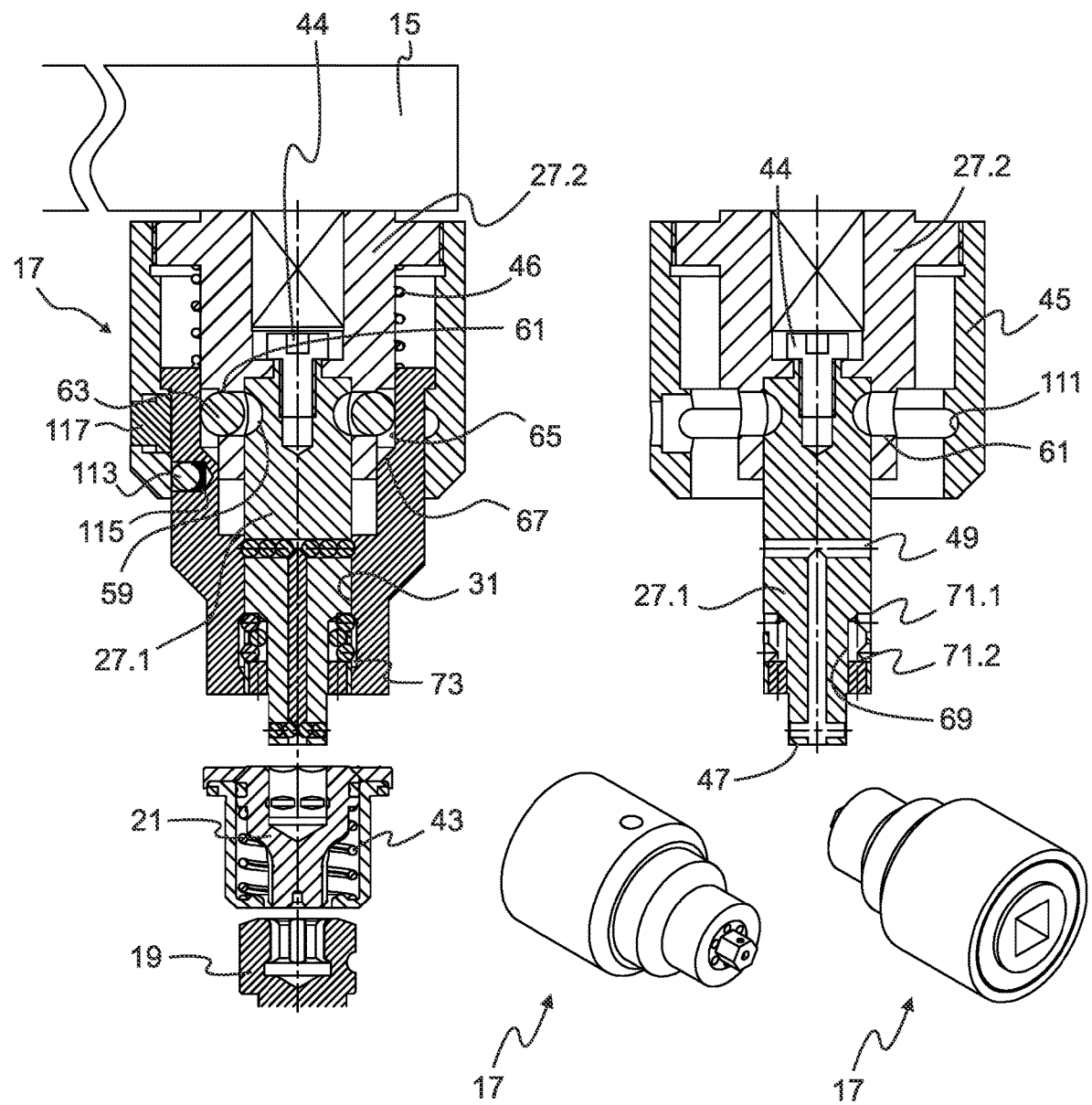

A further embodiment of a drive device 17 according to the invention is shown in FIG. 7. This embodiment is a version of the second embodiment that is provided with additional functionality. The first locking device between the pin 29 and the bolt 21 and the form-fitting coupling between the first part 27.1 of the pin and the second part 27.2 of the pin are the same in both embodiments.

"New" compared with the second embodiment is a second locking device, which results in the drive device 17 being form-fittingly locked on the housing 3 of the driven tool holder 1.

For this purpose, a plurality of U-shaped "channels" for balls 73 are formed in the pin 27. The channels each consist of two short transverse bores 71 and a longitudinal bore 69 connecting these bores 71. In the left-hand part of FIG. 7 it can be clearly seen that three balls 73 are received in the three bores 71, 69. Furthermore, it can be clearly seen in FIG. 7 and in representations "D" and "E" of FIG. 8 that the bores 69 and 71 are dimensioned such that at least one of the balls 73 always projects slightly beyond the outer diameter of the second portion 31 of the pin 27 in the radial direction.

In the housing 57, a free space 75 interacting with the balls 73 is formed having a guide bevel 77 (see also FIG. 7). This leads to the fact that with a sufficiently large relative movement of the pin 27 relative to the housing 57, the uppermost ball 73 in FIGS. 7 and 8 is pressed by the guide bevel 77 into the bore 71 and, as a result, the lowermost ball 73 is pressed radially outward.

The mode of operation of this second locking device is clear from the various representations "A" to "E" in FIG. 8. In representations "A," "B," "C" and "D," this drive device 17 acts like the second embodiment according to FIGS. 5 and 6.

If now, as shown in "E," the second portion 31 of the pin 27 has moved so far relative to the housing 57 (downward in FIG. 8) that the guide bevel 77 at the lower end of the free space 75 presses the uppermost ball 73 inward into the transverse bore 71, the lowermost ball 73 is pressed radially outward and under a bevel of the guide plate 39. This results in a form-fitting connection between the drive device 17 and the guide plate 39 and thus also the driven tool holder 1.

The first locking device and the second locking device are designed such that they are activated one after the other and, when the second locking device is locked, the machine operator receives visual and tactile feedback that the drive device 17 or the operating key 13 has been correctly and fully inserted into the operating device 9 of the tool holder 1.

A locking-clamping mechanism is necessary so that the drive device 17 remains in the locked position. One possible embodiment of the locking-clamping mechanism is shown in Fig. "A" to "E" and in the section along the line G-G belonging to "E." A recess 111 is provided in the inner diameter of the sleeve 45. In the housing 57, a spring-loaded ball 113 is arranged in a blind hole 115. The spring 113 presses the ball 113 against the inner diameter of the sleeve 45. When the drive device 17 has reached the locked position, the ball 113 and the recess 111 are at the same level (see representation "E" in FIG. 8) and the ball 113 is pressed into the recess 111 by the spring. The locking-clamping mechanism is active and locks the drive device 17 in the locked position. A release button 117 is provided for unlocking.

Figure 9:
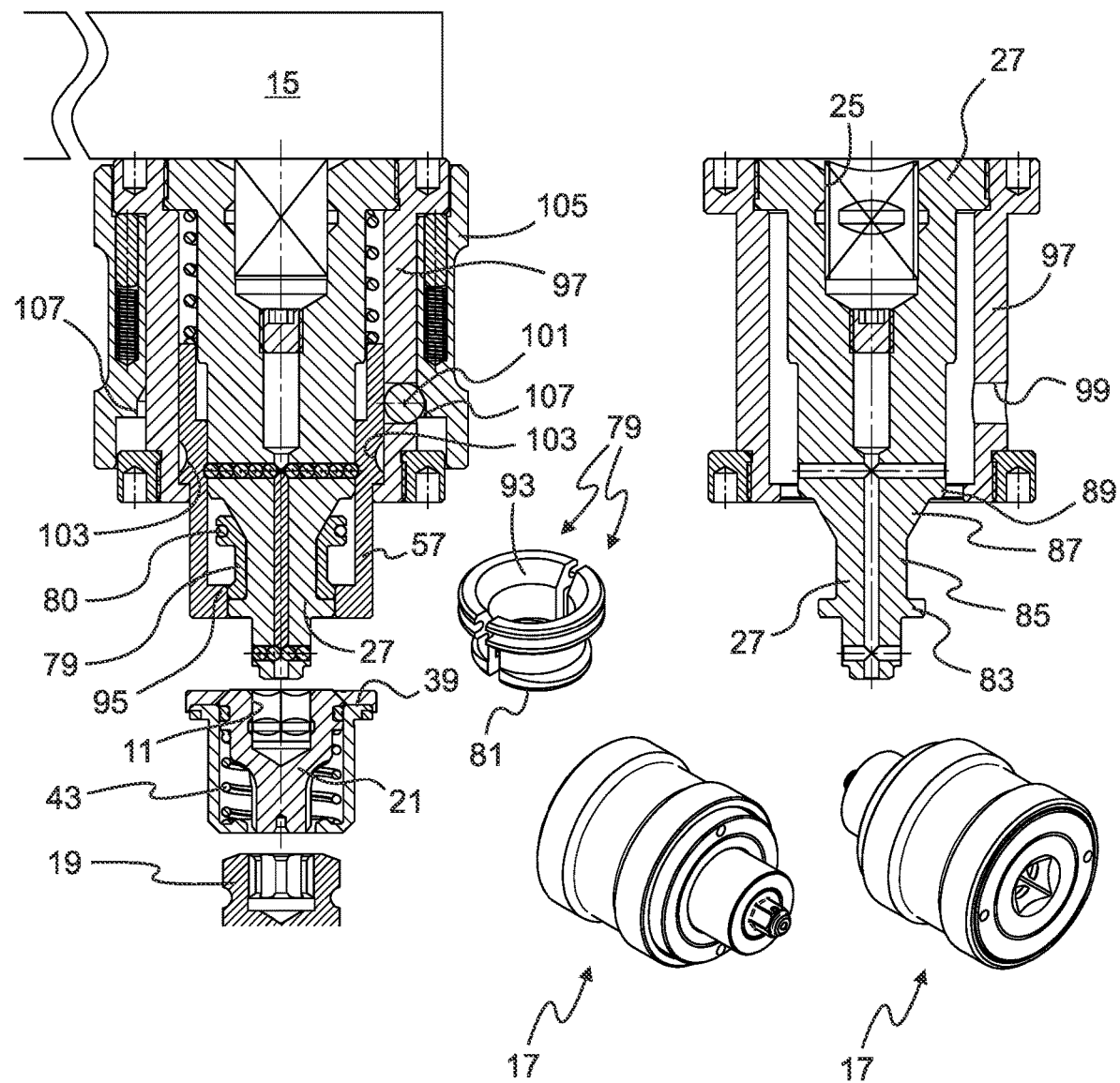
FIGS. 9 and 10 show various representations of a fourth embodiment (solution D).
Figure 10:
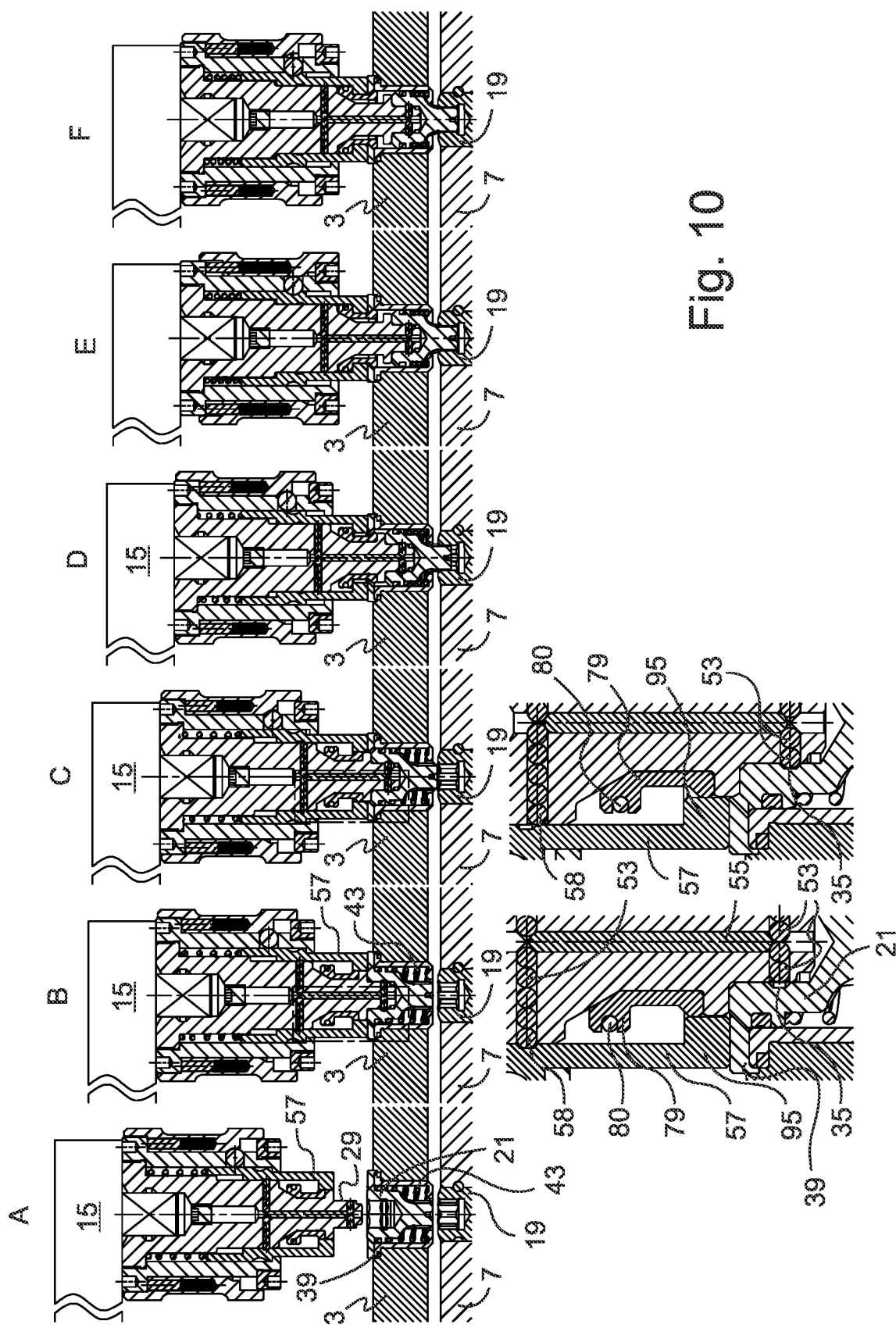

In FIGS. 9 and 10, a fourth embodiment of a drive device 17 according to the invention is shown in various views.

In this fourth embodiment, two locking devices and a locking-clamping mechanism are integrated. The first locking device, which locks the first portion 29 of the pin 27 to the bolt 21 of a tool holder 1, corresponds to the locking described above with reference to the second and third embodiments.

The second locking device, which couples the drive device 17 to the housing 3 of the tool holder 1, more precisely to the guide plate 39 of the tool holder 1, uses at least two expanding jaws 79 to lock the drive device 17 to the housing 3 of the driven tool holder 1. The locking-clamping mechanism can also be combined with other first and second locking devices.

In FIG. 9, the expanding jaws 79 are shown in an isometric drawing. At their lower end they each have a circumferential rib 81 projecting radially outward. The rib 81 is pushed under the guide plate 39 of the tool holder 1 and the lock is thereby established.

As can be seen from the sectional representation of the pin 27 and the housing 57 of the fourth embodiment in FIG. 9, a first collar 83, a cylindrical portion 85, a run-on bevel 87 and a second collar 89 are formed on the pin 27. The first collar 83 and the second collar 89 limit the relative movement of the expanding jaws 79 with respect to the pin 27. The expanding jaws 79 are driven apart in the radial direction via the run-on bevel 87 and the ribs 81 are thus pushed under the guide plate 39 of the tool holder 1. This activates the locking.

The inner contour of the expanding jaws 79 corresponds to the outer contour of the pin 27. In particular, an inner diameter of the expanding jaws 79 is matched to the diameter of the cylindrical portion 85. At the upper end in FIG. 9, the expanding jaws 79 have a frustoconical surface 93 which cooperates with the run-on bevel 87 of the pin 27.

Overall, the length of the expanding jaws 79 is smaller than the distance between the first collar 83 and the second collar 89, such that the expanding jaws 79 can move in the axial direction relative to the pin 27.

A longitudinal section through this fourth embodiment is shown in the upper left-hand part of FIG. 9. This representation shows that the housing 57 has a shoulder 95 at the lower end. The shoulder 95 is dimensioned such that it serves as a guide for the first collar 83. In addition, it also serves to position the expanding jaws 79 and in particular the ribs 81 thereof such that the outer diameter formed by the ribs 81 is smaller than the through-opening in the guide plate 39 of the driven tool holder. Only then can the ribs 81 of the expanding jaws 79 be inserted into the through-opening 41 in the guide plate 39. The expanding jaws 79 are held together by a circumferential worm spring 80 and thus lie against the cylindrical portion 85 and the run-on bevel 87.

If the pin 27 is now moved downward relative to the housing 57 in FIG. 9 and the expanding jaw runs onto the shoulder 95, then the interaction between the run-on bevel 87 and the cone 93 of the expanding jaws 79 causes the expanding jaws to be forced radially outward such that the ribs 81 engage behind the guide plate 39. The desired second lock is thus established.

This sequence is shown in FIG. 10 in representations "A" to "F." The mode of operation of this embodiment of a second locking device can be seen particularly well by comparing representations "D" and "E." In representation "D," the ribs 81 of the expanding jaw 79 still have the same diameter as the first collar 83 of the pin 27.

In the position shown in "E," the run-on bevel 87 has pressed the expanding jaws radially outward such that the ribs 81 of the expanding jaws 79 engage behind the guide plate 39 of the tool holder 1 and the lock is thus established.

In the fourth embodiment according to FIGS. 9 and 10, a locking-clamping mechanism is also integrated in addition to the first locking device and the second locking device. This locking-clamping mechanism is used to secure the position of the pin 27 and the housing 57 when the first locking device and the second locking device are active and thus the operating device according to the invention is form-fittingly connected to the tool holder 1.

At the top right in FIG. 9, the pin 27 and a sleeve 97 are shown in section. In this embodiment, the pin 27 is in one piece. The sleeve 97 is connected to the pin 27 by a thread. The sleeve 97 is arranged coaxially with the pin 27. One or more transverse bores 99 are provided in the sleeve 97. The diameter of the transverse bores 99 is greater than the wall thickness of the sleeve 97, such that a locking ball 101 inserted into the transverse bore 99 (see top left in FIG. 9) projects either to the right or to the left beyond the end of the transverse bore 99.

As the longitudinal section in the left-hand part of FIG. 9 illustrates, a recess 103 is formed in the housing 57. In a clamping position of the locking-clamping mechanism (see view "E" in FIG. 10), the transverse bores 99 are at the same level as the recess 103. It is possible in that case to press the locking ball 101 into the recess 103 such that a connection that is form-fitting in the axial direction is created between the housing 57 and the pin 27 via the sleeve 97.

The locking ball 101 is pressed into the recess 103 by a sliding coupling 105, which extends axially slidably on the sleeve 97. In FIG. 9, the sliding coupling 105 is shown in its upper position. At its lower end, the sliding coupling 105 has a widened diameter portion 107 on the inside, which portion is approximately the same depth as the recess 103 in the housing 57.

In FIG. 9, the locking ball 101 is largely located in the transverse bore 99 and a small part of the locking ball 101 projects into the widened diameter portion 107 of the sliding coupling 105, such that the locking ball 101 does not project inward beyond the inner diameter of the sleeve 97 in the radial direction. This is prevented by the outer diameter of the housing 57, which is matched to the inner diameter of the sleeve 97.

In FIG. 10, the fourth embodiment is shown in six different positions "A" to "F." With respect to the clamping mechanism, representations "E," "D" and "F" are of particular interest.

In representation "D," the transverse bores 99 and the recess 103 in the housing 57 are not yet aligned, and so it is not possible to slide the sliding coupling 105 downward relative to the sleeve 97 and to move the locking ball 101 radially inward toward the housing 57.

In representation "E," the transverse bores 99 and the recess 103 are aligned such that it is now possible to move the sliding coupling 105 downward relative to the sleeve 97 and in this way to press the locking ball 101 into the depression 103. As a result, the sleeve 97 and, together therewith, the pin 27 are locked relative to the housing 57. This means that despite the compression spring 109 between the pin 27 and the housing 57, the pin 27 does not change its position (clamping position). This happens only when the sliding coupling 105 is moved upward relative to the sleeve 97, as shown in representation "F" in FIG. 10. The locking-clamping mechanism is then unlocked.

The invention claimed is:

1. A system comprising:
   a driven or stationary tool holder with a housing, a tool holding fixture and a tool clamping system comprising an operating device configured to actuate a clamping mechanism, wherein the operating device comprises a bolt rotatably mounted in the housing of the driven or stationary tool holder, and wherein the operating device comprises a guide plate;
   a torque-providing device comprising at least one of a lever arm, a screwdriver, a torque wrench, an electromechanicaly, pneumatically or hydraulically driven wrench, and an industrial robot; and
   a drive and locking device that is configured to transmit torques from the torque-providing device to the operating device of the tool clamping system of the driven or stationary tool holder, the drive and locking device having a pin, wherein the pin comprises:
      a distal portion that is configured for form-fitting torque transmission between the drive and locking device and a socket of the bolt of the operating device of the tool holder, wherein the distal portion of the pin includes at least one first locking device comprising at least one of a spring ring, a spring-loaded machine element, a spring-loaded ball, a locking ball and a spring-loaded bolt, and wherein the first locking device of the pin is configured to engage with at least one recess of the socket of the bolt of the operating device; and
      a proximal portion that comprises a cylindrical structure, wherein the cylindrical structure of the proximal portion of the pin includes at least one second locking device comprising at least one of a spring ring, a spring-loaded machine element, a spring-loaded ball, a locking ball, and a spring loaded bolt, and wherein the second locking device of the pin is configured to lock the drive and locking device to the guide plate of the operating device.

2. The system according to claim 1, characterized in that the first locking device and the second locking device are activated one after the other when the drive and locking device is inserted into the operating device of the tool holder.

3. The system according to claim 1, characterized in that said drive and locking device has a drive end and an output end, and in that a first interface to the torque-providing apparatus is provided on the drive end.

4. The system according to claim 3, characterized in that the first portion on the output end is in the form of a torque-transmitting second interface on the output end to the operating device of the driven or stationary tool holder.

5. The system according to claim 3, characterized in that the first interface on the drive end is compatible with a torque wrench, a lever, a screwdriver, a wrench or an interface of an industrial robot as a torque-providing apparatus.

6. The system according to claim 3, characterized in that the drive and locking device and the torque-providing device are formed in one piece.

7. The system according to claim 1, characterized in that said device has a locking-clamping mechanism which holds the position of the pin relative to the housing in two stable positions.

8. The system according to claim 7, characterized in that the locking-clamping mechanism comprises a sleeve having an inner bore and a cylindrical guide surface, in that at least one transverse bore for receiving a locking ball is provided in the sleeve, in that the transverse bores are shorter than the diameter of the locking balls, in that a recess is formed in the housing, in that the transverse bores and the locking balls are at the same level when the drive and locking device is in the locking position, in that a sliding coupling extends axially slidably on the guide surface of the sleeve, and in that, by sliding the sliding coupling, the locking balls are pressed into the recess in the housing.

9. The system according to claim 8, characterized in that the sleeve is connected to the pin or the pin and the sleeve are made in one piece.

10. The system according to claim 1, wherein the guide plate has a through-opening, wherein the proximal portion of the pin is dimensioned such that it passes through the through-opening, wherein the second locking device, in its relaxed position, is slightly larger in diameter than the through-opening in the guide plate, wherein, when the drive and locking device is inserted into the operating device of the tool holder, the second locking device is briefly compressed when it passes through the through-opening, wherein, after passing through the through-opening, the second locking device springs back again and in this way latches or locks the drive and locking device to the guide plate of the tool holder.

\* \* \* \* \*